United States Patent Office 3,168,568
Patented Feb. 2, 1965

3,168,568
PROCESS FOR PRODUCING UNSYMMETRICAL DIMETHYLHYDRAZINE
Charles C. Clark, Kenmore, and Ralph E. Morningstar, Niagara Falls, N.Y., assignors to Olin Mathieson Chemical Corporation, a corporation of Virginia
No Drawing. Filed Mar. 17, 1954, Ser. No. 416,948
9 Claims. (Cl. 260—583)

This invention relates to the manufacture of certain substituted hydrazines by the reaction of monochloroamine with primary and secondary alkyl amines. It particularly relates to the manufacture of unsymmetrical dimethylhydrazine by the reaction of monochloroamine and dimethylamine.

In the well-known Raschig process for the manufacture of hydrazine, two stages are recognized. In the first of these, monochloroamine is formed by the reaction of ammonia with a hypochlorite, and in the second the monochloroamine reacts with additional ammonia to produce hydrazine. In the application of this process to the manufacture of the alkyl substituted hydrazines, one alternative would be in the first stage to form dimethylchloroamine by the reaction of dimethylamine with a hypochlorite and in the second stage to form unsymmetrical dimethylhydrazine by the reaction of the dimethylchloroamine with additional ammonia. The other alternative would be to form monochloroamine in a first stage and treat it with dimethylamine.

The first of these alternatives appears to have the advantage of forming only one product, namely unsymmetrical dimethylhydrazine, since only one possible chloroamine can result by the action of hypochlorite on dimethylamine. In the alternative process in which a hypochlorite acts on ammonia, the formation of dichloroamine could conceivably complicate the formation of monochloroamine and give rise to undesirable by-products. Furthermore, the monochloroamine first formed could conceivably react with ammonia to form hydrazine instead of subsequently reacting with dimethylamine to form dimethylhydrazine. When these possibilities were investigated, however, the process of forming the dimethylchloroamine and treating it with ammonia was found to result in very low yields of desired product and the reactions were very slow.

The process of the present invention comprises the manufacture of alkyl hydrazines by the reaction of monochloroamine with the appropriate organic amine. The process is particularly useful for the manufacture of unsymmetrical dimethylhydrazine but can also appropriately be applied to the manufacture of unsymmetrical diethylhydrazine or monomethylhydrazine, for example.

In the first stage reaction of ammonia with a hypochlorite it is advantageous to maintain temperatures of about 0° to 15° C., preferably about 0° to 5° C. At higher temperatures chloroamine is consumed by the formation of hydrazine, nitrogen and ammonium chloride. The molar ratio of ammonia to hypochlorite is suitably from approximately the stoichiometric ratio up to about 4:1. When a molar ratio of ammonia to hypochlorite of 0.8:1 was used, for example, the yield of chloroamine was only 28%. An initial hypochlorite concentration of about 100 to 200 grams per liter is appropriate.

In the second stage reaction of monochloroamine with amine, say dimethylamine, the ratio of dimethylamine to chloroamine should be maintained within a range of about 2:1 to 8:1. Lower ratios lead to lower yields of the desired product. Higher ratios can be used but the increased quantities of dimethylamine to be recovered and recycled impose a burden on the process which is usually not economically justified considering the relatively small increases in yield obtained thereby.

The concentration of the dimethylamine solution used in the second step is not critical but is advantageously as high as convenient. For example, a 25% by weight aqueous solution can be used at atmospheric pressure. More dilute solutions, say 10%, render the separation of the desired product more expensive due to the additional quantities of water present. More concentrated solutions, say 35%, can be used provided suitable pressures are applied to the system.

The temperature is advantageously maintained in the range of about 10° C. to 60° C. The second stage reaction proceeds very slowly at lower temperatures. When the second stage reaction was carried out at 100° C., the yield was only 7%. Yields are best in the preferred temperature range.

The process of the present invention can be carried out continuously by metering chlorine into a flowing stream of caustic maintained at about 0° to 5° C. to form sodium hypochlorite, then injecting ammonia to react with the hypochlorite and form monochloroamine and finally introducing dimethylamine in suitable excess, simultaneously raising the temperature of the flowing stream to about 40° C. The reactor for the synthesis reaction at 40° C. can be a sufficient length of piping to provide a suitable holding time. The effluent is suitably charged to a continuous fractionator operating to distill dimethylamine, dimethylhydrazine and water overhead, removing salt, caustic and most of the water as bottoms. Treatment of the overhead fraction with strong caustic permits the separation of a layer consisting largely of dimethylamine and dimethylhydrazine. The latter can be further dried with caustic and distilled to separate dimethylamine for recycle and dimethylhydrazine as product.

Example I

A solution of aqeous sodium hydroxide (3.05 normal) was maintained at 10° C. while gaseous chlorine was passed in until the pH was 11. The hypochlorite solution was added slowly to 1.53 molar aqueous ammonia containing 0.2% of glue, maintaining the temperature at 0°–2° C. The ratio of ammonia to hypochlorite was about 1.3:1. The resulting chloroamine solution was added to sufficient of a 25% by weight aqueous dimethylamine solution to give a molar ratio of dimethylamine to chloroamine of about 5.1:1. The mixture was maintained at 40° C. and the concentration of dimethylhydrazine was determined from time to time by potentiometric titration with standard potassium iodate solution. The yield based on the chlorine used was about 74% after 15 minutes, about 76% after 1.75 hours and about 78% after 12 hours. The final yield was about 82% based on the dimethylamine consumed. Thus the reaction was substantially complete in about 15 minutes or less.

Example II

A solution of aqueous sodium hypochlorite approximately 2-molar was prepared by passing chlorine gas into a cooled 4-molar solution of sodium hydroxide until a strong yellow color was produced. The chlorination was stopped while the solution was still alkaline. This solution was added to an equal volume of aqueous ammonia which was about 2-molar and contained 0.2%, of glue, based on the weight of the solution. The temperature was maintained at 0° to 2° C. by adding cracked ice. After standing for one hour the chloroamine solution was mixed at a temperature of 0° to 10° C. with about one-fifth of its volume of 25% by weight aqueous dimethylamine solution. The reaction was complete in about one hour during which time the temperature rose to about 25° C. Analysis showed that dimethylhydrazine was formed in a yield of about 57.8% based on the chlorine used.

Our invention is generally applicable to the preparation of unsymmetrical monoalkyl- and dialkylhydrazines, preferably those in which each alkyl radical contains not more than five carbon atoms. Such hydrazines can be made by substituting monomethylamine, mono-ethylamine, diethylamine, n-propylamine, mono-isopropylamine, di-sopropylamine, n-butylamine, n-amylamine and the like for the dimethylamine used in these specific examples.

We claim:

1. A method for the preparation of a compound of the formula RR'NNH$_2$ which comprises reacting monochloroamine and RR'NH in aqueous solution at 10° to 60° C. to form RR'NNH$_2$, the molar ratio of RR'NH to monochloroamine being within the range 2:1 to 8:1, R being an alkyl radical having from one to five carbon atoms and R' being selected from the group consisting of hydrogen and alkyl radicals having from one to five carbon atoms.

2. A method according to claim 1 in which R and R' are methyl.

3. A method for the preparation of a compound of the formula RR'NNH$_2$ which comprises reacting sodium hypochlorite and ammonia in aqueous solution at 0° to 15° C. to form monochloroamine and thereafter reacting the monochloroamine and RR'NH in aqueous solution at 10° to 60° C. to form RR'NNH$_2$, the molar ratio of ammonia to hypochlorite being within the range 1:1 to 4:1, the molar ratio of RR'NH to monochloroamine being within the range 2:1 to 8:1, R being an alkyl radical having from one to five carbon atoms and R' being selected from the group consisting of hydrogen and alkyl radicals having from one to five carbon atoms.

4. A method according to claim 3 in which R and R' are methyl.

5. The method of preparing unsymmetrical lower alkyl hydrazines having the general formula:

$$RR'N-NH_2$$

which comprises reacting in an aqueous medium chloramine with a lower alkyl amine having the general formula:

$$RR'NH$$

wherein R is a lower alkyl radical and R' is a radical selected from the group consisting of hydrogen and lower alkyl radicals.

6. The method of preparing unsymmetrical lower alkyl hydrazines having the formula:

$$RR'N-NH_2$$

which comprises reacting chloramine with a lower alkyl amine having the formula:

$$RR'NH$$

wherein R is lower alkyl and R' is selected from the group consisting of hydrogen and lower alkyl, in an aqueous alkaline medium in the presence of glue at a temperature below 100° C.

7. A method according to claim 1 wherein R is methyl and R' is hydrogen.

8. A method according to claim 5 wherein R is methyl and R' is hydrogen.

9. A method according to claim 5 wherein R and R' are methyl.

References Cited by the Examiner

Journal Organic Chem., vol. 14, pages 813–818, (1949); in Chemical Abstracts, vol. 44, page 7756 (1950).

Klages et al.: Ann. vol. 547, pages 1–38 (1941); in Chemical Abstracts, vol. 35 pages 4345, 4346 (1941).

Westphal: Berichte, vol. 74(B), pages 759–776 (1941); in Chemical Abstracts, vol. 35, pages 6568–6570 (1941).

CHARLES B. PARKER, *Primary Examiner.*

WILLIAM G. WILES, ROGER L. CAMPBELL, H. J. LIDOFF, *Examiners.*